(12) United States Patent
Sendonaris et al.

(10) Patent No.: US 9,964,647 B2
(45) Date of Patent: May 8, 2018

(54) DIRECTIONAL PRUNING OF TRANSMITTERS TO IMPROVE POSITION DETERMINATION

(71) Applicant: NextNav, LLC, Sunnyvale, CA (US)

(72) Inventors: Andrew Sendonaris, Los Gatos, CA (US); Norman F. Krasner, Emerald Hills, CA (US)

(73) Assignee: NextNav, LLC, Sunnyvale, CA (US)

( * ) Notice: Subject to any disclaimer, the term of this patent is extended or adjusted under 35 U.S.C. 154(b) by 843 days.

(21) Appl. No.: 14/207,650

(22) Filed: Mar. 13, 2014

(65) Prior Publication Data

US 2014/0266911 A1 Sep. 18, 2014

Related U.S. Application Data

(60) Provisional application No. 61/786,556, filed on Mar. 15, 2013.

(51) Int. Cl.
| | |
|---|---|
| *G01S 19/28* | (2010.01) |
| *G01S 11/04* | (2006.01) |
| *G01S 5/10* | (2006.01) |
| *G01S 5/00* | (2006.01) |
| *G01S 5/02* | (2010.01) |

(52) U.S. Cl.
CPC .......... *G01S 19/28* (2013.01); *G01S 5/0045* (2013.01); *G01S 5/0242* (2013.01); *G01S 5/10* (2013.01); *G01S 11/04* (2013.01)

(58) Field of Classification Search
CPC ........ G01S 5/02; G01S 5/0226; G01S 5/0284; G01S 5/0289; G01S 5/08; G01S 5/10; G01S 5/12; G01S 5/14; G01S 5/145; G01S 5/0221; G01S 5/04; G01S 5/06; G01S 1/026; G01S 19/46; G01S 5/0252; G01S 5/0045; G01S 5/018; G01S 5/0009; G01S 5/0242; G01S 5/0205; G01S 19/28; G01C 21/362
USPC .............................. 342/458, 357.67
See application file for complete search history.

(56) References Cited

U.S. PATENT DOCUMENTS

| | | | | |
|---|---|---|---|---|
| 5,929,806 A * | 7/1999 | Birchler | ............... | G01S 5/14 |
| | | | | 342/357.29 |
| 5,936,572 A * | 8/1999 | Loomis | ............... | G01C 21/206 |
| | | | | 342/357.29 |
| 6,895,249 B2 * | 5/2005 | Gaal | ............... | G01S 5/0045 |
| | | | | 342/357.395 |

(Continued)

FOREIGN PATENT DOCUMENTS

WO     2004/021733 A1     3/2004

OTHER PUBLICATIONS

Information about Related Patents and Patent Applications, see the section attached hereto entitled Related Patents and Patent Applications for further information.

(Continued)

*Primary Examiner* — Gregory C. Issing

(57) ABSTRACT

Described are systems and methods for estimating a position of receiver using ranging signals from different regions in a network of transmitters. In some embodiments, each ranging signal that exceeds a quality criterion is assigned to one of several defined regions based on a characteristic of that ranging signal. A maximum number of ranging signals per region may be selected and used during trilateration.

36 Claims, 7 Drawing Sheets

(56) References Cited

U.S. PATENT DOCUMENTS

| | | | |
|---|---|---|---|
| 7,647,055 B2* | 1/2010 | Gum | G01S 5/0252 455/456.1 |
| 8,213,957 B2* | 7/2012 | Bull | G01S 5/02 370/328 |
| 8,289,210 B2* | 10/2012 | Thomson | G01S 5/02 342/451 |
| 9,008,700 B2* | 4/2015 | Mukkavilli | G01S 5/0205 370/332 |
| 2003/0004640 A1* | 1/2003 | Vayanos | G01S 5/14 701/469 |
| 2005/0266855 A1* | 12/2005 | Zeng | G01S 5/0252 455/456.1 |
| 2006/0068809 A1 | 3/2006 | Wengler | |
| 2006/0217127 A1* | 9/2006 | Drane | G01C 21/362 455/456.1 |
| 2007/0013584 A1* | 1/2007 | Camp, Jr. | G01S 5/0027 342/458 |
| 2009/0213004 A1* | 8/2009 | Rhodes | G01S 19/06 342/357.43 |
| 2010/0079332 A1* | 4/2010 | Garin | G01S 19/08 342/357.64 |
| 2010/0234045 A1* | 9/2010 | Karr | G01S 1/026 455/456.1 |
| 2010/0272316 A1* | 10/2010 | Tayob | G01S 5/0018 382/103 |
| 2010/0331013 A1 | 12/2010 | Zhang | |
| 2011/0057833 A1* | 3/2011 | France | G01S 19/32 342/357.25 |
| 2011/0057836 A1* | 3/2011 | Ische | G01S 5/0009 342/357.43 |
| 2011/0090122 A1* | 4/2011 | Thomson | G01S 5/02 342/450 |
| 2011/0221635 A1* | 9/2011 | Wang | G01S 5/0242 342/463 |
| 2013/0169484 A1* | 7/2013 | Raghupathy | G01S 19/46 342/386 |
| 2013/0342396 A1* | 12/2013 | O'Connor | G01S 19/05 342/357.42 |

OTHER PUBLICATIONS

Form PCT/ISA220, PCT/US2014/025141, "Notification of Transmittal of the International Search Report and the Written Opinion of the International Searching Authority, of the Declaration", 1 page; Form PCT/ISA/210, PCT/US2014/025141, "International Search Report", 4 pages; Form ISA/237, PCT/US2014/025141, "Written Opinion of the International Searching Authority", 5 pages.
U.S. Appl. No. 14/207,650, filed Mar. 13, 2014, Sendonaris.
U.S. Appl. No. 14/207,651, filed Mar. 13, 2014, Sendonaris.

* cited by examiner

Direct path signal blocked; multipath signal 115b reflected

DIRECTIONAL PRUNING OF TRANSMITTERS TO IMPROVE POSITION DETERMINATION

CROSS REFERENCE TO RELATED APPLICATIONS

This application claims priority under 35 U.S.C. § 119(e) to U.S. Provisional Patent Application Ser. No. 61/786,556, filed Mar. 15, 2013, entitled DIRECTIONAL PRUNING OF TRANSMITTERS To IMPROVE POSITION DETERMINATION, the content of which is hereby incorporated by reference herein in its entirety for all purposes.

FIELD

Various embodiments relate to wireless communications, and more particularly, to networks, devices, methods and computer-readable media for estimating a position of a receiver using ranging signals from different regions in a network of transmitters.

BACKGROUND

It is desirable to estimate the position (or "location") of persons and things in a geographic area with a reasonable degree of accuracy. Accurate estimations of a position can be used to speed up emergency response times, track business assets, and link a consumer to a nearby business. Various techniques are used to estimate the position of an object (e.g., a receiver). One such technique is trilateration, which is the process of using geometry to estimate a location of an object using distances traveled by different signals that are transmitted from geographically-distributed transmitters and later received at a location of the object.

In many urban terrestrial positioning systems, a "line-of-sight" signal path from a transmitter to a receiver is blocked by buildings and the like, leaving only reflected paths over which a "multipath" signal travels from the transmitter to the receiver. Using the distance of the reflected path during trilateration processing can lead to less accurate estimates of a receiver's position. However, one cannot simply ignore multipath signals that adversely affect the trilateration result without consideration of increased geometric position error associated with using only the remaining signals that may be unevenly distributed around the receiver. Thus, there is a natural tradeoff between reducing errors due to multipath and reducing errors due to poor geometry of transmitters relative to the position of a receiver.

Accordingly, there is a need for improved techniques that better account for such errors.

SUMMARY

Certain embodiments of this disclosure relate generally to networks, devices, methods and computer-readable media for estimating a position of a receiver. Such networks, devices, methods and computer-readable media may identify a first set of detectable ranging signals based upon a quality criterion, determine signal characteristic(s) of each ranging signal in the first set, associate each ranging signal from the first set with one of a plurality of groups based on the signal characteristic(s) of that ranging signal, and determining an estimated position of the receiver using at least one range measurement corresponding to at least one ranging signal in each of the plurality of groups that includes a ranging signal from the first set.

DRAWINGS

DESCRIPTION

Figure 1A:
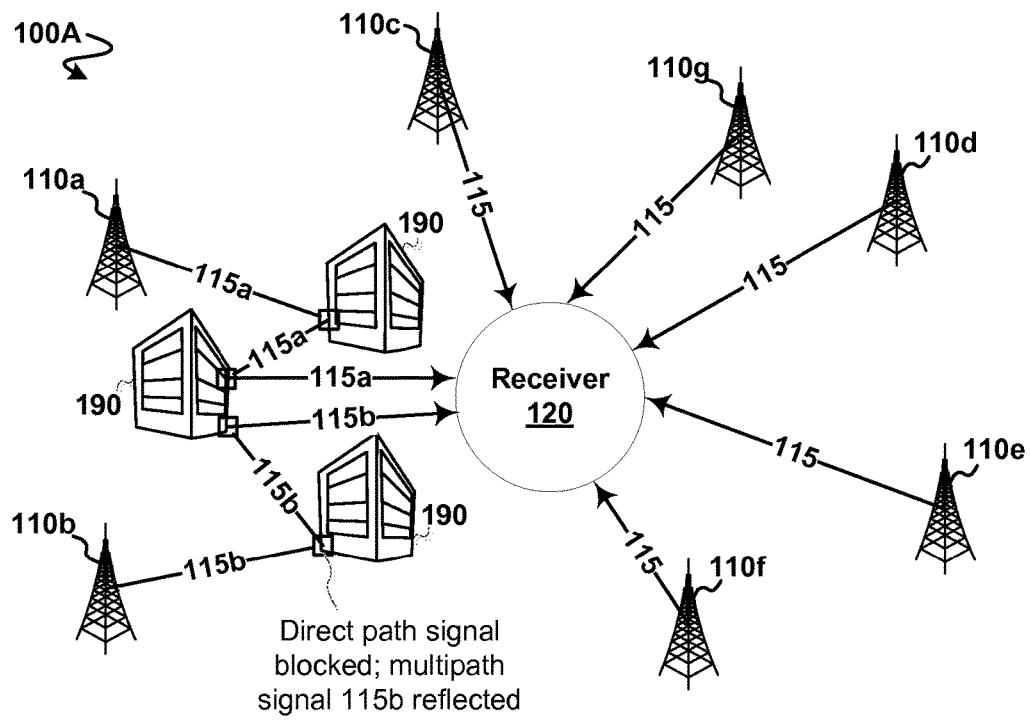
FIG. 1A depicts aspects of a terrestrial positioning system.

Aspects of the disclosure generally relate to grouping ranging signals based on geographic characteristics of those ranging signals (e.g., the location of transmitters from which those ranging signals originated) and/or based on quality of those ranging signals (e.g., the effect range measurements, corresponding to those ranging signals, would have on the accuracy of an estimate of a receiver's position).

Some aspects of this disclosure relate to forming groups based on the quality of received signals, and then estimating a receiver's position using range measurements corresponding to groups of higher-quality information extracted from signals ("good" signals), but without using lesser-quality information extracted from signals ("bad" signals). Other aspects relate to forming groups of signals using geographic information associated with those signals, and then estimating a receiver's position using at least one range measurement corresponding to a signal from each group. Certain aspects relate to the combination of the operations: (A) forming groups of good and bad signals, and (B) forming groups of signals in different regions. Various implementations are envisioned, including: A, then B; B, then A; A and B at same time; A, then B using a subset of groups from A; and B, then A using a subset of groups from B.

Groups of signals may be formed to increase the likelihood that range measurements used to estimate a receiver's position will correspond to signals from different regions around an initial estimate of the receiver's position. In one embodiment, various regions are identified. Each region is evaluated to determine if a good signal originated from that region (i.e., was transmitted by a transmitter from that region). If one of the regions does not contain such a signal, then a bad signal from that region is identified to improve transmitter geometry relative to the receiver. Range measurements corresponding to each region (or only the regions with at least one signal of preferred quality) are selected. Those range measurements are then used to generate a refined estimate of the receiver's position. Of course, initial identification of the regions may not be necessary, and groups of signals/transmitters may be formed without consideration of pre-identified regions. Such groups, by way of example, may be formed based on relative locations of transmitters. The number of regions or groups may vary depending on the approximate position of the receiver (which may be moving), the nature and position of the transmitters, and other factors. Hence, the number of regions or grouping of signals may not be static as a function of position or time.

It is to be understood that identifying possible groups/regions can be performed prior to any collection of data (e.g., the groups may simply be quadrants relative to some assumed orientation corresponding to the initial position estimate). Alternatively, the groups/regions may be identified after some data has been collected. For example, if it is known that a certain range of azimuths corresponds to azimuths of a multitude of signals, like in an azimuthal region pointed toward a city, then the groups may be specified considering such information. In one embodiment, signals are collected and azimuths corresponding to the transmitters of those signals are determined using an initial estimate of the receiver's position and the locations of the transmitters. The transmitter locations may be transmitted, for example, via information contained within the structure of the signals. Once azimuths are determined, groups are formed to represent regions in different directions from the initial position estimate such that some minimum level of "dilution of precision" (DOP) is assumed to exist relative to the actual position of the receiver. This may not always be successful, however, especially when the accuracy of the initial estimate is unreliable such that transmitters thought to be in one direction from the initial position estimate are actually along another direction from the actual position of the receiver. These and other aspects are discussed in further detail below.

Overview

Attention is now drawn to FIG. 1A, which depicts a positioning system 100A that includes a plurality of transmitters 110a-g and a receiver 120. "Ranging" signals 115a-g that are transmitted from each of the transmitters 110a-g are collected by the receiver 120, and later used to estimate the position of the receiver 120 relative to the position of the transmitters 110a-g. One process of estimating the position of the receiver 120 is referred to as trilateration, which is the process of using geometry to determine a location of the receiver using range measurements derived from the reception of signals at a receiver. In order to determine the location of the receiver 120 within a tolerated amount of error (e.g., 1 to 10 meters), received signals may be used to derive accurate range measurements. In "time-of-arrival" positioning systems, for example, a signal's travel time can be measured and converted to a distance or "range" using the speed of light. It should be noted that a signal's travel time is the difference between the time of day when the signal is transmitted and the time of day when that signal is received, where the latter is measured by the receiver 120. Of course, some signal epoch is typically utilized for such time of day indications. In many cases the receiver 120 has an imprecise time of day clock and an error or "bias" is introduced into such a measurement. In this case, the above range, with the bias present, is termed a "pseudorange." Since the bias is common to all signals concurrently received, the trilateration process may determine the bias as part of an overall location solution, as long as a sufficiently large number of measurements are made at the receiver 120.

Unfortunately, positioning systems like the system 100A shown in FIG. 1A are often deployed in urban environments where buildings 190 and other obstructions block direct path ranging signals. These buildings reflect ranging signals, as illustrated by the reflected (or "multipath") signals 115a-b in FIG. 1. When a signal comprises one or more reflected segments, the overall travel time of that signal is increased, which results in inaccurate range measurements. Inaccurate range measurements, along with other issues associated with reflected signals, are often undesirable because they adversely affect the estimate of a receiver's position after trilateration processing, which can result in an amount of position error greater than what is tolerated (e.g., greater than x units of measurement). Accordingly, it is often desirable to identify inaccurate range measurements, and then adjust/filter or eliminate ("prune") those measurements during trilateration processing. Identification and pruning allows for removal of poor measurements which may decrease overall positioning error. Adjustments to the measurements (e.g., reduction of the estimated distance to account for error), or devaluation of the measurements (e.g., by giving the measurements less weight compared to other measurements), may decrease the error in the trilateration result caused by those measurements. Similarly, identifying and using measurements having tolerated amounts of error often leads to better trilateration results.

Pruning transmitter range measurements that exhibit undesirable qualities, however, may result in a remaining set of transmitters that exhibits poor transmitter-receiver geometry, which in turn ultimately impairs the precision of position measurements with respect to any or all of latitude, longitude, altitude and time (x, y, z, and t).

Figure 1B:
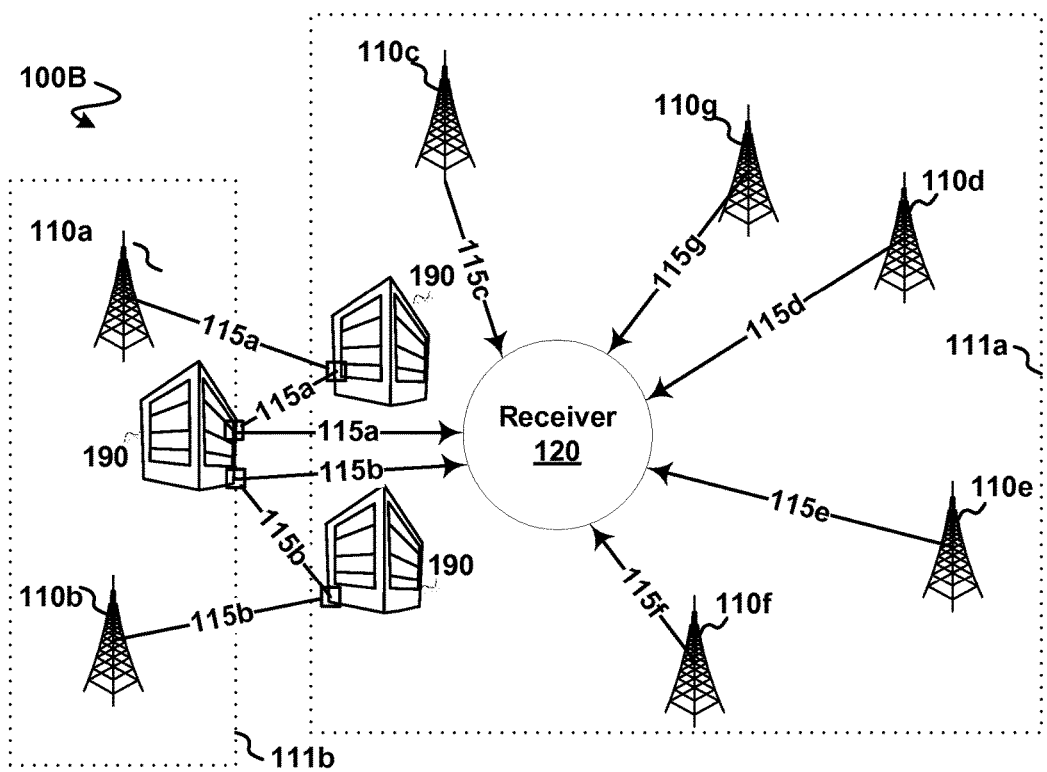
FIG. 1B depicts two sets of transmitters in a terrestrial positioning system.

FIG. 1B illustrates a system 100B with a transmitter set 111a and another transmitter set 111b. For purposes of illustration, the transmitter set 111b represents a set of pruned transmitters—e.g., because signals 115a-b are multipath signals that would introduce range error into trilateration processing. As shown, transmitter set 111a does not include transmitters that are located on one side of the receiver 120 where transmitter set 111b is located. Ideally, trilateration processing would use range measurements from transmitters that collectively are distributed around the receiver 120. For example, if there were no multipath present in the signals received from transmitters 111b, trilateration processing would use range measurements corresponding to each transmitter in the transmitter set 111a and each transmitter is the transmitter set 111b, as compared to using range measurements corresponding to only the transmitter set 111a, which does not provide for transmitters on one side of the receiver 120. This is because using only the transmitters in the transmitter set 111a may produce a position estimate with an unacceptable amount of geometric position error. Such geometric position error is often represented by a "dilution of precision" (DOP) value, which refers to a measure of the evenness of distribution (e.g., azimuthal distribution) of transmitters with respect to a receiver's location. Of more concern to this discussion is the geometric dilution of precision (GDOP), since the full definition of DOP includes effects of time errors. The GDOP is further broken down into a horizontal dilution of precision (HDOP) and a vertical dilution of precision (VDOP). The horizontal dilution of precision may be further broken down into components such as components in orthogonal directions (e.g. East and North), radial and azimuthal, and others. These individual components may be of significant interest, since a poor DOP in a particular direction may be undesirable, even though an overall DOP may seem acceptable.

In some cases, the result of trilateration processing using ranging signals from only transmitter set 111a is less accurate than the result of trilateration processing using ranging signals from both of the transmitter set 111a and at least one of the transmitters 110a-b in transmitter set 111b, even when the ranging signals from the transmitters 110a-b do not produce an accurate measurement of the shortest distance between the receiver and those transmitters 110a-b. Of course, the opposite is true in other cases. Thus, accuracy of a position estimate may be a function of error caused by a multipath effect on individual ranging signals and also error caused by uneven geometric distribution of transmitters relative to the receiver 120. Thus, there is a natural tradeoff in use of reflected signals where such tradeoff is between errors due to multipath and those due to poor DOP.

When geometric distribution of transmitters around a receiver is considered, range measurements from multipath signals are used together with range measurements from direct path signals so that a position estimate computed using those measurements results in a DOP that is less than a maximum allowable threshold value In particular embodiments, successive position estimates may be computed using different groups of range measurements until the DOP threshold condition is met by the current group of range measurements. Alternatively, in other embodiments, multiple position estimates may be computed using different groups of range measurements, and the position estimate associated with the lowest DOP level may be selected. In some embodiments, the individual components of the GDOP are examined (e.g. East, North, Up), and the criteria for selecting different groups involves simultaneously minimizing the DOPs of these individual measurements. In all of these cases, it is noted that consideration of many transmitter sets can lead to a computationally complex load that increases time to first fix (TTFF), so identifying the first position estimate to meet the DOP threshold condition, versus selecting the position estimate with best DOP, may be preferred.

Maintaining Minimum Amount of Transmitter Distribution

Figure 2A:
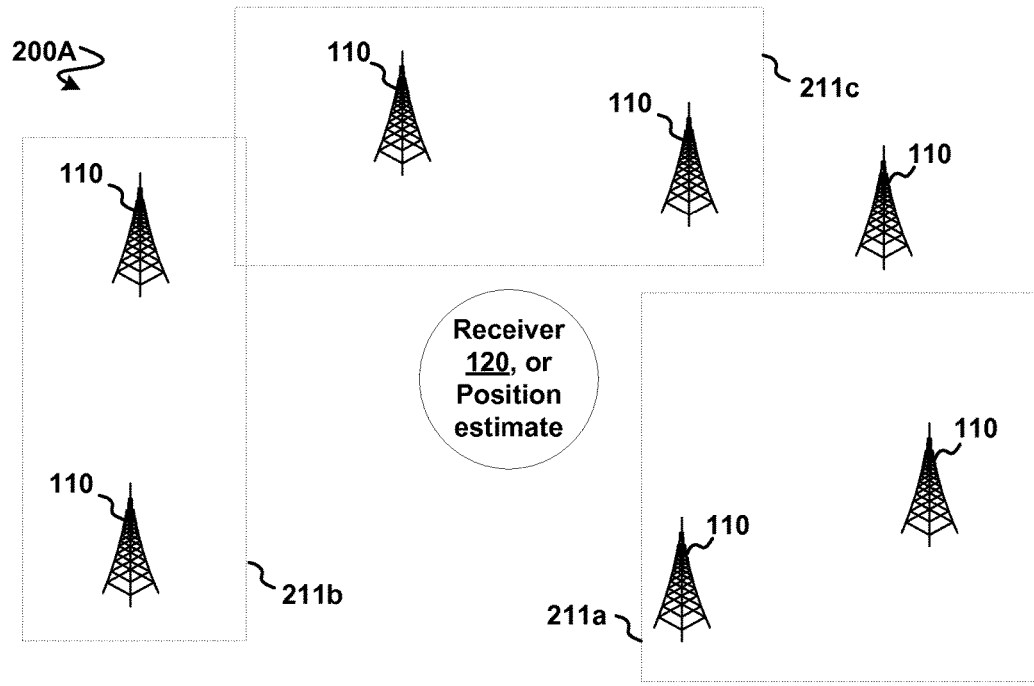
FIG. 2A depicts sets of transmitters in different regions within a positioning system.
Figure 2B:
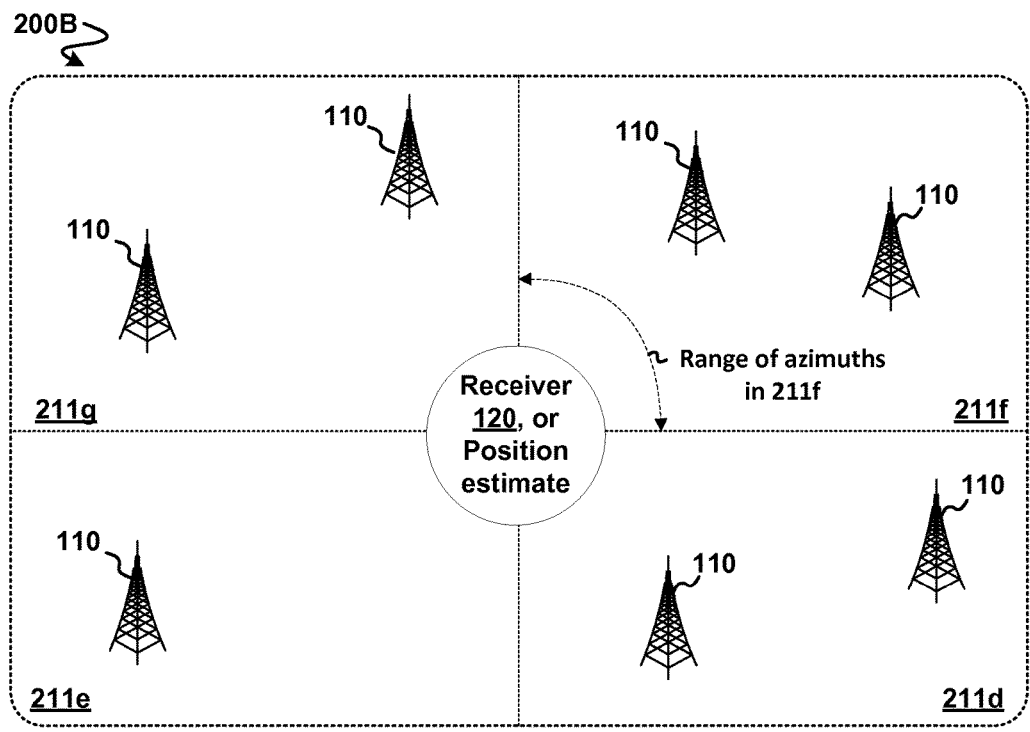
FIG. 2B depicts different regions within a positioning system that are defined by different ranges of azimuths.
Figure 2C:
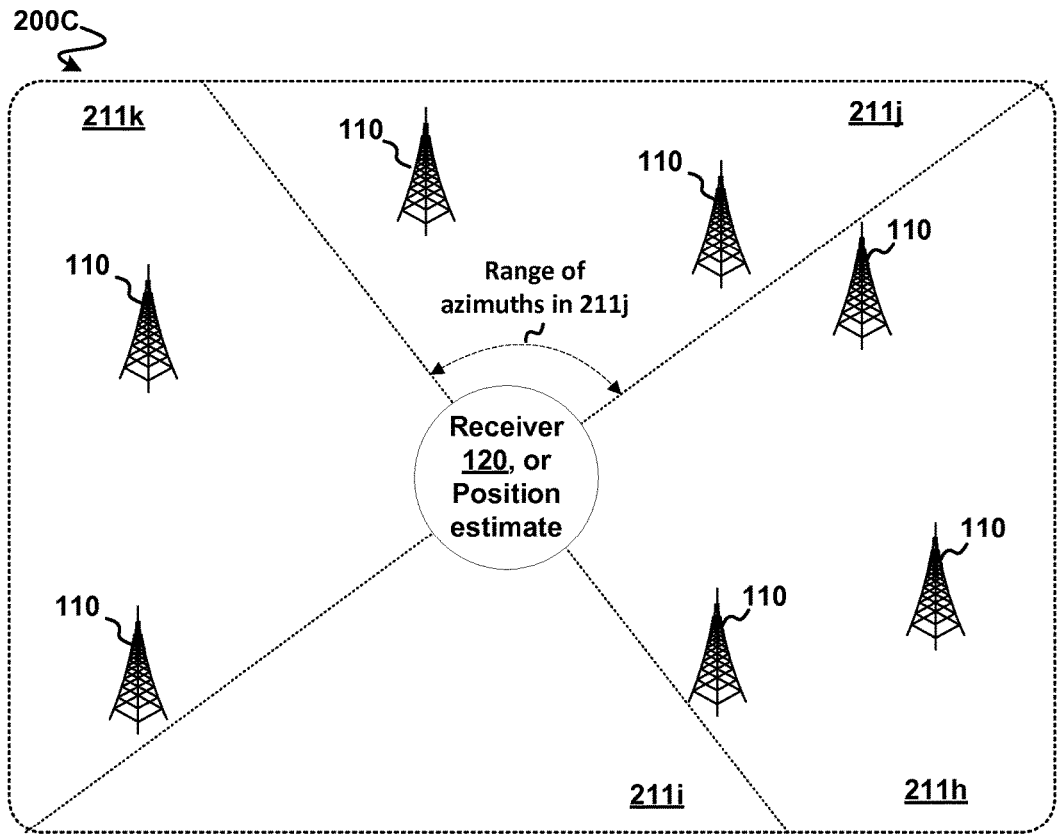
FIG. 2C depicts different regions within a positioning system, where only some of the regions include a transmitter.

In some embodiments, "over pruning" of range measurements is avoided by including possible multipath range measurements from transmitters located in underrepresented geographic areas—e.g., one such geographic area classification can be azimuthal regions spanning a range of azimuths. Several embodiments are illustrated in FIG. 2A, FIG. 2B and FIG. 2C. In these embodiments, the transmitters 110 of systems 200A, 200B and 200C are identified for inclusion into different transmitter sets, each of which correspond to different geographic regions 211a-c, 211d-g and 211h-k relative to the location of a receiver 120 or an initial position estimate of the receiver 120.

FIG. 2A illustrates geographic regions 211a-c of unequal size, within which equal numbers of the transmitters 110 reside. As shown, two regions can overlap, where the overlap may or may not include a transmitter.

FIG. 2B illustrates geographic regions 211d-g, each of which are defined by different ranges of azimuths, which may be referred to as "azimuthal regions". Such regions may also be termed "radial sections" or "radial sectors" since they are defined by the region between two radial lines at different azimuths. The number of ranging signals chosen for each region may be equal or unequal in size. At least one transmitter resides within each of the regions 211d-g.

FIG. 2C illustrates a geographic region 211i, within which none of the transmitters 110 reside. In some embodiments, transmitter sets in each region may be individually analyzed to select (if possible) a fixed number of range measurement (s) corresponding to ranging signal(s) received from that transmitter set. The situation of FIG. 2C may lead to a less accurate position estimate when only one distance measurement per region is used to estimate the position of the receiver 120, since it is possible that no transmitters are selected on the lower side of the true or estimated position of the receiver 120.

On the other hand in FIG. 2B, if one transmitter per region is selected, two of the transmitters on the lower side of the true or estimated position of the receiver 120 would be selected based on the regions in FIG. 2B (i.e., one in 211e and one in 211d), and these two transmitters are on opposite sides (i.e., east-west) of the true or estimated position of the receiver 120, thus further reducing DOP-related error.

Division of the transmitters 110 into transmitter sets may be accomplished using various techniques, including dividing transmitters into geographic regions based on the general azimuthal region within which each of the transmitters 110 resides relative to an estimated position of the receiver 120. Such azimuthal division is illustrated in FIG. 2B and FIG. 2C. As the receiver 120 moves, new sets of transmitters may be formed.

In some embodiments, determination of transmitter sets may also be determined before any position is estimated. For example, transmitter sets may be based on which ranging signals have been received by the receiver 120, and the knowledge of the location of the transmitters corresponding to these signals. The implicit assumption here is that the receiver is located somewhere in the geographic middle of set of locations of the transmitters.

Figure 2D:
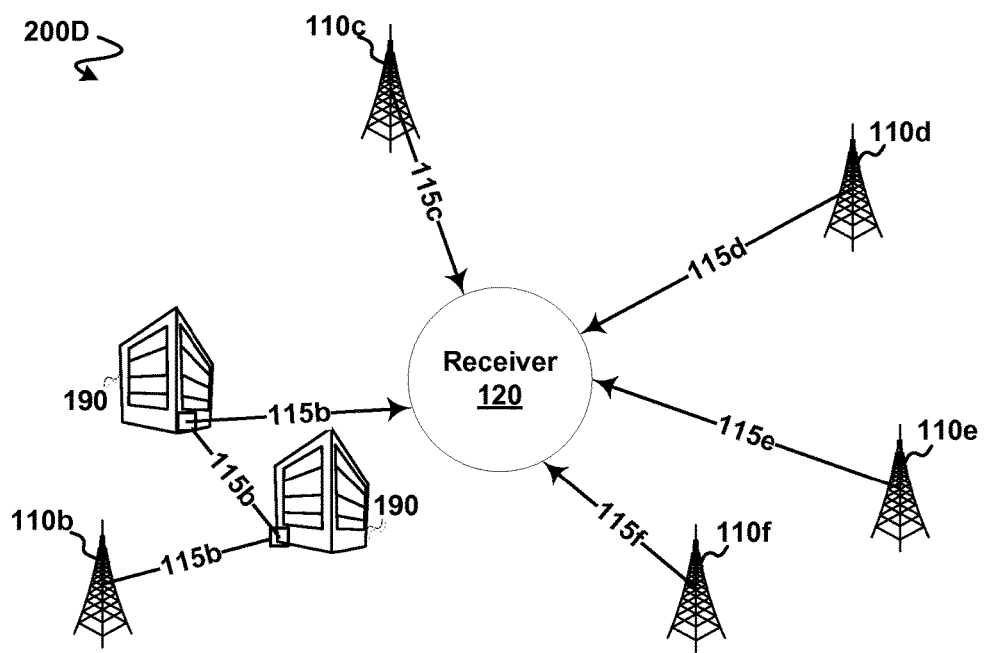
FIG. 2D depicts transmitters that are distributed around a receiver.

As illustrated by a system 200D in FIG. 2D, if the receiver 120 receives the signals 115b and 115c-f from the transmitters 110b-f, each residing at a known location (e.g. the transmitter locations or transmitter identifiers, may be sent in the signaling data), then groups of transmitters may be determined to best distribute those five transmitters into regions that minimize DOP-related error. For example, some groups may be determined by comparing where each transmitter is located relative to the other transmitters so that a group may be formed to include transmitters that are in close proximity with each other, while other groups may be formed to include a different one of the remaining transmitters that are not located in close proximity with each other.

Alternatively, initial range measurements associated with signals 115b and 115c-f may be used to determine hypothesized receiver locations and then use this information to relate locations of the transmitters to the hypothesized locations of the receiver 120. Then, transmitter sets may be formed based on the hypothesized locations of the receiver 120. As an example, if only four range measurements are to be used in computing a final position solution, with each measurement corresponding to a different region, a different group would ideally be formed for each of the transmitters 110b-d, and one group would be formed for the transmitters 110e-f, with only one transmitter selected from this latter group, since the locations of transmitters 110e-f are closer to each other relative to locations of the other transmitters 110b-d. This is a simplified example. More important examples are those from situations when a large number of transmitters are in range of the receiver, and the receiver desires to cluster these into a small number of groups.

Optimizing the Estimation of a Receiver's Position

As discussed above, in order to improve trilateration performance, information extracted from ranging signals originating from transmitters that adversely affect the position estimate from trilateration processing may be removed, adjusted, or devalued. One way of achieving better trilateration performance is to remove transmitters that are "bad" according some quality metric. Such a quality metric may relate to an estimated range error, an estimated distance to receiver, a weight applied to a range measurement, and other metrics known in the art. However, ignoring range measurements from "bad" transmitters during trilateration processing in favor of only using range measurements from the remaining set of transmitters that are "good" according to their values of the quality metric, may result in poor Dilution of Precision (DOP) relative to the position estimate from trilateration processing. Therefore, range measurements corresponding to candidate transmitters that adversely affect the trilateration result may be identified and removed in such a way as to increase the chance that a minimum DOP threshold condition is met after those candidate transmitters are removed.

Transmitters, signals and range measurement may be referred to in terms of good or bad, high-quality or lesser-quality, poor or better, poorer performing or better performing, preferred or non/less-preferred, or other contrasting descriptions. It is intended that use of such nomenclature will eliminate excess wording.

In some embodiments, such descriptions refer to the quality of range measurements or other information extracted from ranging signals transmitted by transmitters in relation to the effect such information would have on the accuracy of a position estimate if used during trilateration. The terms do not necessarily refer to the quality of the signals themselves. For example, it may be the case that signal strength is high for a received signal that emanates from a transmitter known to be located in the middle of an urban canyon having strong multipath. In this case, the location of the transmitter, relative to the receiver's true or estimated position, may negatively contribute to a quality metric that measures the a multipath quality of the signal, even though the signal strength may exceed a minimum strength threshold. In other cases, the signal characteristics themselves may be paramount. Thus the quality metric, as further detailed later, may measure a variety of information.

It should also be noted that all signals received are normally subject to some type of initial detection criterion to ensure that they are not mistaken for noise (i.e., a false alarm). In some embodiments, signals that pass such tests can be further classified in accordance with a quality metric. Thus, in some embodiments, a "bad" transmitter does not mean that the signal it transmitted is likely to be a noise spike, but rather that the use of information extracted from that signal for position estimation is thought to be less preferred than not using the information extracted from that signal. The terminology "visible" or "in view" is sometimes used to denote the fact that a received signal from a transmitter is distinguishable from noise.

It is noted that division between good and bad transmitters may be accomplished by comparing quality metric values for each transmitter/signal/range measurement to a threshold value, where a quality metric value above the threshold value designates a good transmitter/signal/range measurement, and a quality metric value below the threshold value designates a bad transmitter/signal/range measurement. A transmitter/signal/range measurement may be denoted as "preferred" or "non-preferred" in accordance with whether or not it exceeds the threshold value.

One approach to avoid removing all range measurements that correspond to candidate transmitters positioned in the same general area relative to the position of the receiver involves removing range measurements that correspond to a sub-set of those candidate transmitters. By way of example, as illustrated in FIG. 2B, the area around the true position or estimated position of the receiver 120 may be divided into N transmitter regions. (e.g., 4 quadrants). Transmitters in each region may then be analyzed to identify poorer performing transmitters, or conversely, better performing transmitters in relation to a quality metric. In each region, M transmitters may be selected as the better performing transmitters (e.g., 1 or 2 transmitters from each region), assuming M transmitters are present. If less are present, then all may be chosen.

When a region does not include a minimum number of good transmitters in relation to some quality metric, an approach may be taken to alleviate this situation in some cases. For example, a range measurement corresponding to a bad transmitter may be used during trilateration processing, subject perhaps to additional tests. In some cases, using any range measurement associated with any of the bad transmitters would introduce unacceptable position error. It may therefore be necessary to identify a lower threshold value to evaluate the bad transmitters. For example, division between acceptable bad transmitters and unacceptable bad transmitters may be accomplished by comparing values of the same or different quality metric for each bad transmitter to the lower threshold value, where a quality metric value above the lower threshold value designates an acceptable bad transmitter, and a quality metric value below the lower threshold value designates a bad transmitter.

It is further contemplated that only a subset of visible transmitters are divided into regions for pruning so that a remaining subset of transmitters exhibiting preferred qualities are not pruned. For example, a detectability criterion may be used to prequalify signals in order to avoid false alarms. These and other aspects are illustrated in FIG. 3.

Figure 3:
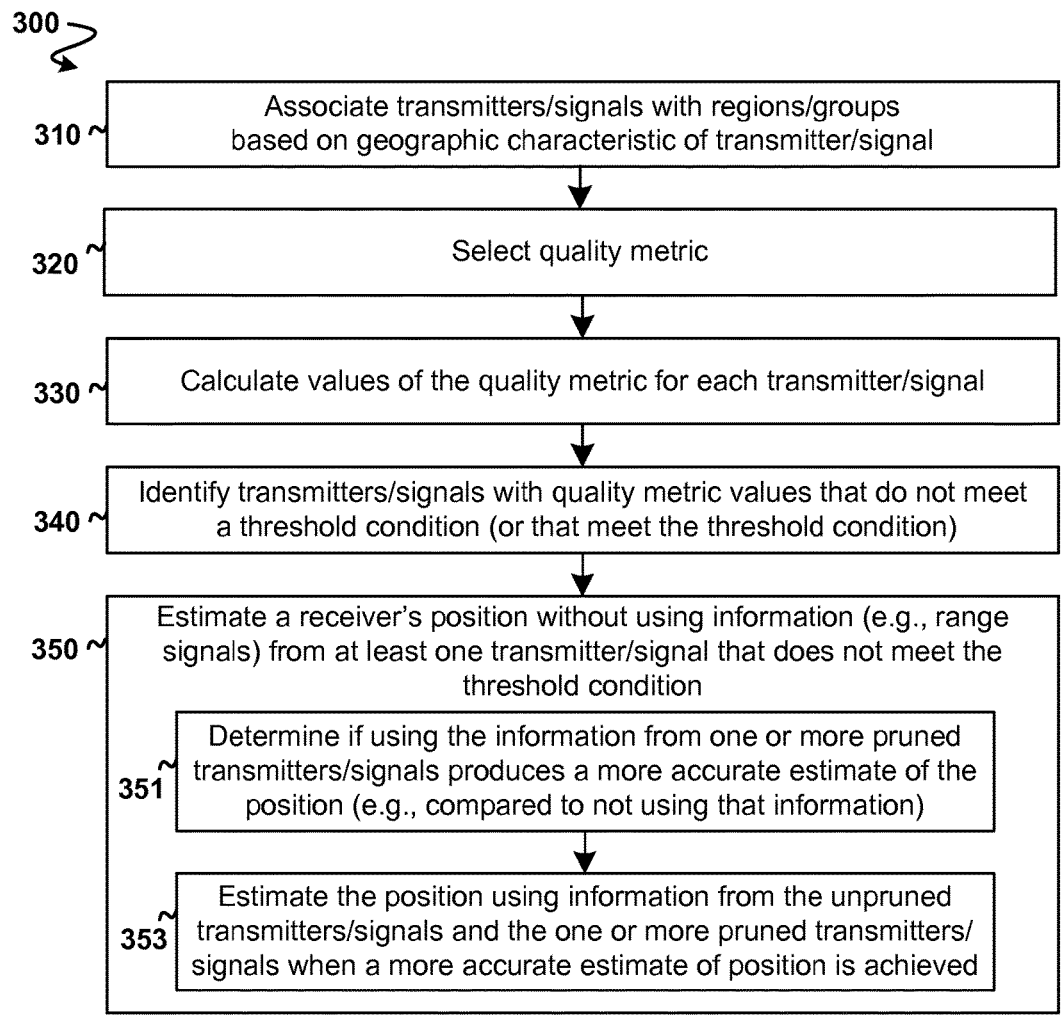
FIG. 3 illustrates a process for grouping transmitters to minimize geometric position error, identifying better performing transmitters in each group, and using some or all of the range measurements from each group to estimate a receiver's position.

FIG. 3 illustrates a methodology 300 for grouping transmitters to minimize geometric position error, identifying better performing transmitters in each group, and using some or all of the range measurements from each group to estimate a receiver's position.

It is noted that discussion corresponding to FIG. 3 in relation to groups (e.g., to which any number of transmitters or signals belong) applies to regions (e.g., within which any number of transmitters reside, or from which any number of signals originated). Accordingly, a group and a region may relate to each other in that they each include the same transmitters/signals.

As shown in FIG. 3, transmitters (or signals) are associated with one or more groups based on a characteristic of each transmitter (310). In some embodiments, the characteristic relates to the location of the transmitter, which can be used to identify groups of transmitters from generally the same region in the network. However, some neighboring transmitters may be placed in different groups to optimize transmitter-receiver geometry where only some signals from each group are used during trilateration.

In one embodiment, the characteristic relates to the location of the transmitter with respect to an initial estimate of the receiver's position. For example, the characteristic may include an estimated azimuth along which the transmitter is located relative to the initiation position estimate. Alternatively, the characteristic may include the transmitter's coordinates (latitude, longitude and altitude) relative to the coordinates of the initial position estimate. Each characteristic of each transmitter may then be used to identify groups of transmitters. Using FIG. 2A as an example, the coordinates of each transmitter 110 relative to coordinates of the position estimate may be used to form groups 211a-c. Using FIG. 2B as an example, the azimuth of each transmitter 110 relative to the position estimate may be used to form azimuthal groups 211d-g.

In another embodiment, the characteristic relates to the location of the transmitter with respect to other transmitters. For example, the characteristic may include coordinates of the transmitter's location, and characteristics among transmitters may be compared to form groups of neighboring transmitters, or transmitters in close proximity to each other.

A group may be formed by selecting boundaries (e.g., azimuth ranges, a set of regions having some geometric shape, and the like), and comparing the characteristic of each transmitter to the boundaries to determine the group to which that transmitters belongs.

It is noted that groups may be adaptively formed in order to provide better trilateration performance. For example, a particular orientation of quadrants, such as those of FIG. 2C may result in a quadrant having no transmitters (e.g., region 211i). If the overall orientation or boundaries is rotated by an amount, e.g., 45 degrees, then all quadrants may contain transmitters as shown in FIG. 2B, and hence any pruning procedure may be improved.

A group may be determined without selecting boundaries. For example, transmitters may be grouped based on how similar their characteristics are from one another. One approach includes determining the distances between position coordinates or azimuths, and then grouping transmitters corresponding to distances that are below a threshold level (e.g., predefined, or a function of all distances).

Groups may be chosen so that each region surrounding an initial estimate of the receiver's position includes a minimum number of transmitters (e.g., to improve the DOP corresponding to the position estimate). Alternatively, groups may be chosen so that each group includes a minimum or maximum number of transmitters.

Figure 5A:
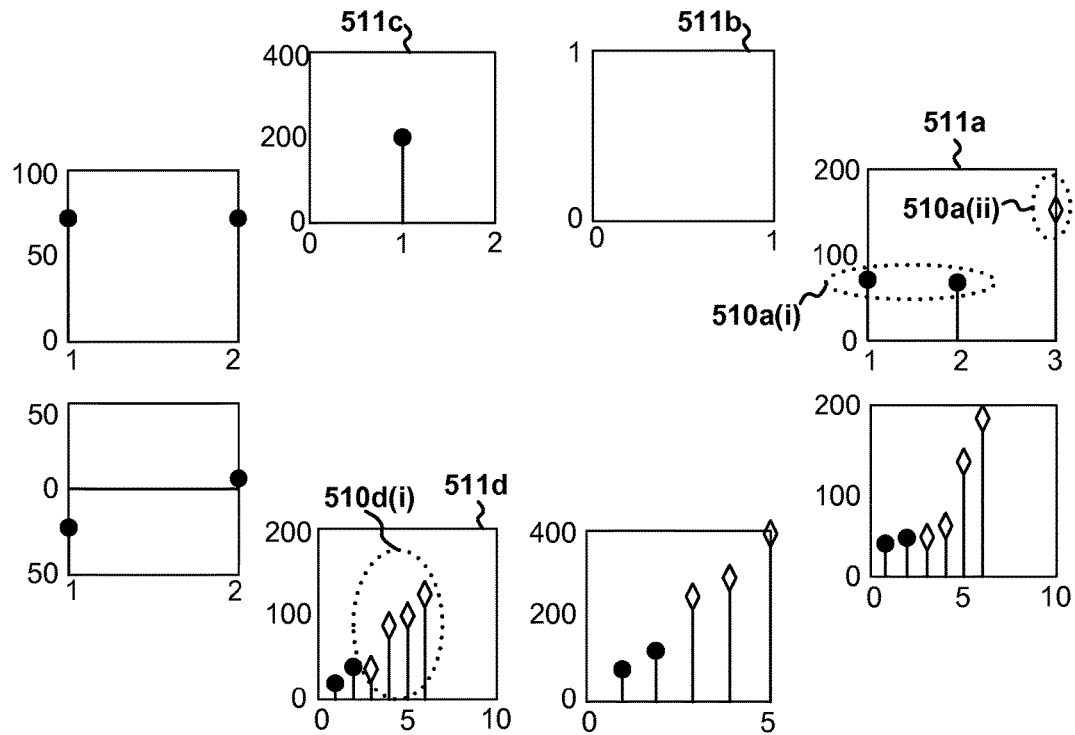
FIG. 5A and FIG. 5B illustrate how division of transmitters may be carried out.
Figure 5B:
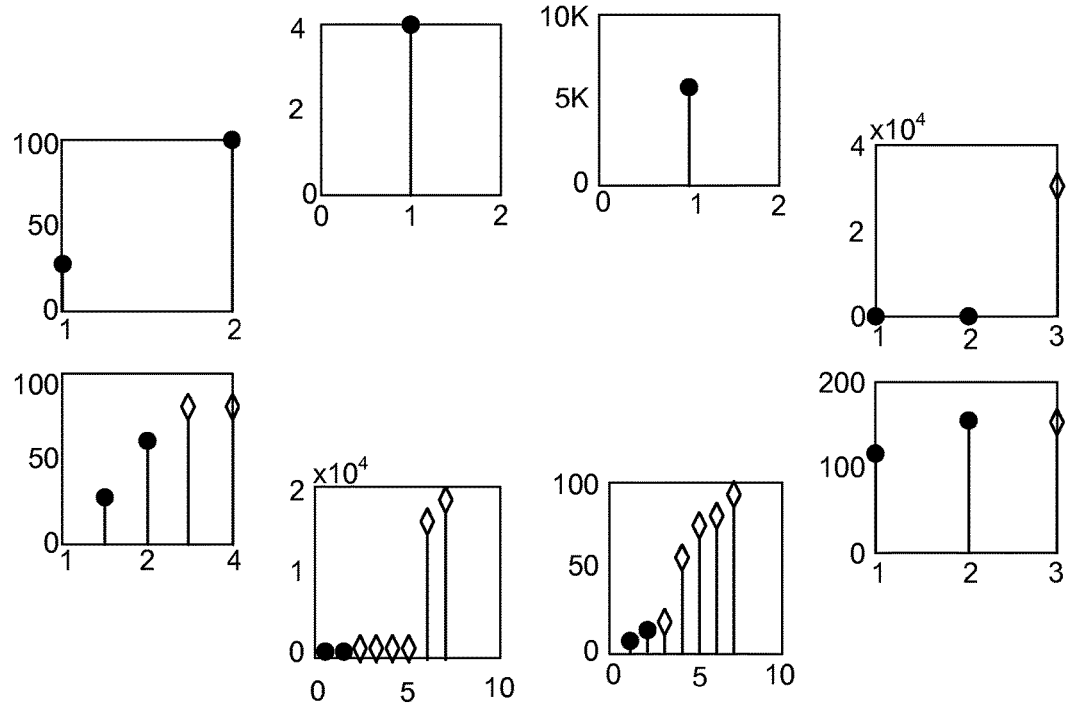

FIG. 5A and FIG. 5B illustrate how division of transmitters may be carried out. As shown in FIG. 5A and FIG. 5B, there may be eight regions, where each rectangle represents a region. The desired number of transmitters per region may be a specified number. One way of choosing the regions is to consider terrain and building map obstruction information in such a way where regions that have a lot of terrain or building clutter may have a lesser number of transmitters or a greater number of transmitters. For simplicity, up to two transmitters per region are illustrated, where range measurements corresponding to one transmitter are depicted by circles and range measurements corresponding to another transmitter are depicted by diamonds. Each rectangle charts different range measurements per transmitter in that region. Here the vertical axis represents a perceived relative distance from a transmitter, and the horizontal axis indicates the measurement number. As shown, the number of range measurements corresponding to each rectangle may vary. Multiple range measurements per transmitter indicate different multiple delayed signals as perceived by the receiver. Of course, the different delayed signals from the same transmitter result in different perceived ranges for signals from the same transmitter. The ranges may be better thought of as path delays, since of course the line-of-sight distance to the transmitter would be the same for all signals emanating from it.

In FIG. 5A, for example, rectangle 511a may represent a region with two transmitters, where the two charted measurements designated by circles 510a(i) correspond to one transmitter and the charted measurement designated by the diamond 510a(ii) corresponds to another transmitter of the region 511a. Each transmitter may transmit a ranging signal, and the receiver may receive different instances of that ranging signal after it travels along different paths before reaching the receiver. For example, the two charted measurements designated by circles 510a(i) correspond to different instances of a ranging signal that may have each traveled along different paths between the originating transmitter and the receiver. In rectangle 511d, for example, measurements designated by diamonds 510d(i) correspond to four different instances of a ranging signal that may have each traveled along different paths between the originating transmitter and the receiver. The instance corresponding to the shortest distance (i.e., the left-most diamond among the diamonds designated by 510d(i)) may be selected as the most accurate measurement of the distance between the receiver and that originating transmitter, and the other distances may be removed from a trilateration computation. In some regions, like the region represented by the rectangle 511b, the receiver may not receive any ranging signals from a transmitter. In other regions, like the region represented by the rectangle 511c, the receiver may only receive a ranging signal from one transmitter.

Attention is returned to FIG. 3, which illustrates that a pruning (or "quality") metric is selected (320), and a value of that quality metric is calculated for each transmitter (330). The quality metric values corresponding to each transmitter may be evaluated against a quality metric threshold condition (340). It is noted that the operations designated as 320, 330 and 340 can be performed before the operation designated as 310. In other words, the pruning operation may occur before the grouping operation. Decreases in overall processing time may be possible by waiting to group only good transmitters, or waiting to see if enough groups of good transmitters can be formed before adding poorer performing transmitters to a group. Range measurements from each group may be selected for trilateration processing.

The quality metric values corresponding to each transmitter may be evaluated against a quality metric threshold condition to identify quality metric values that do not meet the quality metric threshold condition and/or identify quality metric values that meet the threshold condition. Range measurements corresponding to quality metric values that do not meet the quality metric threshold condition may be removed from, adjusted or devalued prior to being used during trilateration processing. Range measurements corresponding to quality metric values that meet the quality metric threshold condition may be selected (e.g., used during trilateration processing). As mentioned previously, transmitters whose quality metrics meet the quality metric threshold condition are referred to as "preferred transmitters" and the range measurements associated with such transmitters are referred to as "preferred range measurements." Similarly those transmitters whose quality metrics do not meet the quality metric threshold condition are referred to as "non-preferred transmitters" and their associated range measurements are referred to as "non-preferred range measurements."

The quality metric may relate to one or more of the following metrics: estimated range error (e.g., where estimated range error values, that fall under a maximum estimated range error amount, meet the quality metric threshold condition); trilateration weight, which results from an estimate of ranging error standard deviation (e.g., where trilateration weight values over a minimum trilateration weight amount, or under a maximum trilateration weight amount, meet the quality metric threshold condition depending on whether the weight is inversely or directionally proportional to the estimated ranging error standard deviation); range quality determined using terrain and/or building map information in the direction of the transmitters or from the set of range measurements or from measurements of the signals themselves (e.g., where range quality values above or below a range quality amount meet the quality metric threshold condition); estimated distance to transmitter (e.g., where an estimated distance value for a transmitter that falls below a maximum estimated distance amount, or below other estimated distance amounts for other transmitters, meets the quality metric threshold condition, assuming lower likelihood of multipath effect corresponding to shorter distances); angle of incidence of transmitter, defined as the angle between a straight line from the transmitter to the location or estimated location of the receiver and a horizontal or vertical plane at the location or estimated location of the receiver (e.g., where an angle of incidence value that exceeds a minimum angle of incidence value, or that exceeds an angle of incidence value for another transmitter, does not meet the quality metric threshold condition, assuming lower likelihood of multipath corresponding to lower angle of incidence values); and others.

A quality metric may relate to a density of terrain and manmade objects between a particular transmitter and the true or estimated position of the receiver. Transmitters associated with quality metric values that indicate higher density may be ignored in favor of transmitters associated with quality metric values that indicate lower density. One reason transmitters in lower-density areas are preferred is due to the greater likelihood that signals from higher-density areas are multipath signals. Another reason is due to the greater likelihood that multipath signals from a higher-density area will have more path segments, and therefore correspond to higher multipath error, compared to multipath signals from lower-density areas.

Yet another quality metric may relate to whether each transmitter resides in a region that includes a minimum number of transmitters. Range measurements that correspond to transmitters in regions that do not include a minimum number of transmitters may automatically be used during trilateration processing.

In some embodiments, pruning may be carried out by comparison of the quality metric to a minimum, maximum or predefined value. Alternatively, pruning may be carried out by comparison of a multitude of calculated quality metric values each of which correspond to different transmitters, different ranging signals, and/or different range measurements.

It is noted that values of a quality metric may be a function of any combination of the above metrics, where the function takes in a set of sub-metrics and calculates a final metric that can be used for pruning some of the transmitters. One example of a quality metric would be a linear combination:

$$\text{metric} = \sum_{k=1}^{n} (\text{alpha}(k) * \text{sub\_metric}(k))$$

where alpha(k) is a positive or negative "weight" associated with a particular sub-metric depending on the nature of the $k^{th}$ sub-metric and whether it makes the transmitter more or less desirable, among other considerations.

FIG. 3 illustrates a method 300 where transmitters/signals are associated with one or more groups based on characteristics of each transmitter/signal, and are then analyzed based on values of a quality metric. In other embodiments, the transmitters/signals are first analyzed based on the values of the quality metric, and are then grouped based on the characteristics. Still, in other embodiments, the analysis based on quality metric values and the identification of groups may be performed at the same time. It is further noted that the analysis operation can be performed on a subset of the transmitters/signals that are associated with certain groups. Similarly, the grouping operation can be performed on a subset of the transmitters/signals that have certain quality metric values.

After evaluating whether quality metric values corresponding to each transmitter meet or do not meet the quality metric threshold condition, the receiver's position is estimated without using ranging signals or measurements associated with quality metric values that do not meet the quality metric threshold condition (350). In some embodiments, a ranging signal from a transmitter that corresponds to a quality metric value that does not meet the quality metric threshold condition (i.e., a non-preferred ranging signal) may be identified (351) and used to compute the estimate of the receiver's position (353) when it is determined that using such a ranging signal results in a more accurate estimate of the receiver's position, compared to not using the ranging signal. Of course such a determination is an estimate, or a hypothesis, since the receiver does not know for certain that such an inclusion will in fact improve the position estimate. For example, a determination may be made that using the non-preferred ranging signal, despite its association with a quality metric value that does not meet a threshold condition, results in a position estimate that meets an accuracy threshold condition (e.g., where the position estimate corresponds to an acceptable DOP value, where the position estimate corresponds to an acceptable error in distance from true position of the receiver, or another condition). For example, a ranging signal may be determined to have a large RMS error due to poor SNR and significant multipath, and such an RMS error would not meet the quality metric threshold condition. However, if this signal is the only signal to the west of the receiver, then it may be determined that utilizing this signal in the position estimation procedure would improve the DOP so much that the overall resulting position measurement error would likely be improved. Alternatively, in this case the overall position measurement error may be slightly increased, but the error along a particular direction may be significantly improved.

Improvements to accuracy may be assumed instead of computationally determined when choosing to use a ranging signal from a transmitter that corresponds to a quality metric value that does not meet the quality metric threshold condition. Using FIG. 1B as an example, if one or more groups of transmitters are formed using only the set of good transmitters 110c-f of transmitter set 111a, an assumption may be made that using range signals from at least one of transmitters 110a or 110b will decrease geometric position error and therefore increase accuracy. Accordingly, another group may be formed to include one of the poorer performing transmitters 110a or 110b, such that the new group covers an area that was underrepresented by good transmitters.

Figure 4:
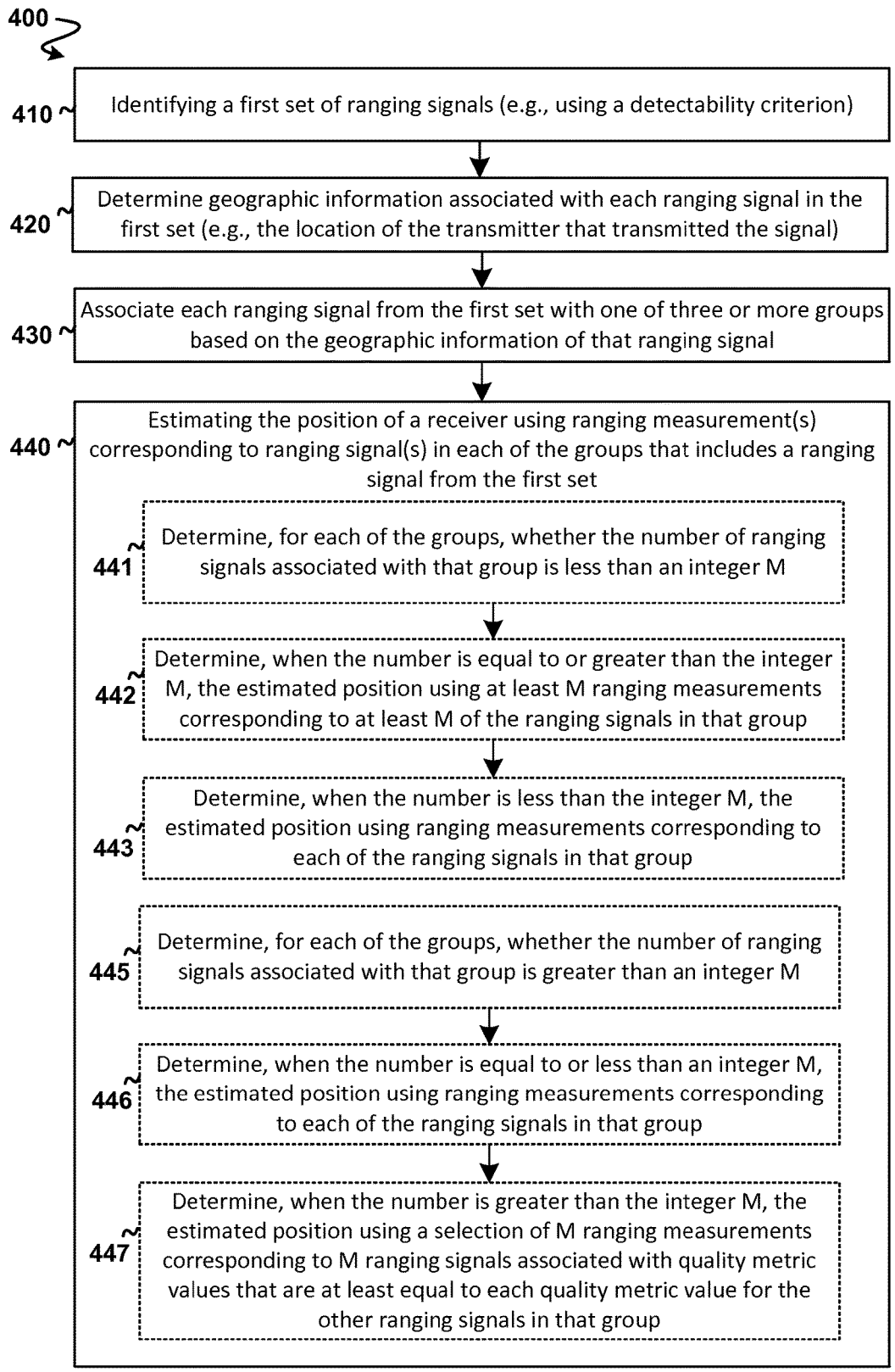
FIG. 4 illustrates a process for identifying better performing transmitters, grouping better performing transmitters to minimize geometric position error, and using some or all of the range measurements from each group to estimate a receiver's position.

FIG. 4 illustrates a methodology 400 for identifying better performing transmitters, grouping better performing transmitters to minimize geometric position error, and using some or all of the range measurements from each group to estimate a receiver's position.

As shown in FIG. 4, a first set of ranging signals are identified (410). For example, a detectability criterion (e.g., an SNR threshold level) may be consulted to identify visible signals from other signals that cannot be distinguished from noise or other interfering signals.

Signal characteristic(s) of each ranging signal in the first set may be determined (420). The signal characteristics may include geographic information associated with the ranging signals. For example, the geographic information may include the location of the transmitter that transmitted the signal (e.g., latitude, longitude, altitude), or it may include the relative location of a transmitter that transmitted the ranging signal with respect to the estimated position of the receiver (e.g., an estimated azimuth, or set of position coordinates relating to the transmitter).

Each ranging signal from the first set may be associated with one of three or more groups (or regions) based on the signal characteristic(s) of that ranging signal (430). For example, each ranging signal may be associated with a particular group (or region) when the azimuth relating to that ranging signal falls within a range of azimuths corresponding to that particular group (or region). The position of a receiver is then estimated using range measurement(s) corresponding to ranging signal(s) in each of the groups that includes a ranging signal from the first set (440).

Additional operations may be performed on each group. In one embodiment, a determination is made as to whether the number of ranging signals associated with a group is less than an integer M (441). When the number is equal to or greater than the integer M, the estimated position is determined using at least M range measurements corresponding to at least M of the ranging signals in that group (442). When the number is less than the integer M, the estimated position is determined using range measurements corresponding to each of the ranging signals in that group (443).

In another embodiment, a determination is made as to whether the number of ranging signals associated with that group is greater than an integer M (445). When the number is equal to or less than M, the estimated position is determined using range measurements corresponding to each of the ranging signals in that group (446). When the number is greater than M, the estimated position is determined using a selection of M range measurements corresponding to M ranging signals associated with quality metric values that are at least equal to each quality metric value for the other unused ranging signals in that group (447).

Additional Methodologies

Functionality and operation disclosed herein may be embodied as one or more methods implemented by processor(s) at one or more many locations. Non-transitory processor-readable media embodying program instructions adapted to be executed to implement the method(s) are also contemplated.

Discussion below relating to groups of transmitters similarly applies to groups of ranging signals, since both correspond to range measurements that are used or not used to estimate the position of a receiver. It is noted that ranging signals, instead of transmitters may be associated with groups based on the characteristics of the transmitters from which those ranging signals originated. Such ranging signals can also be identified as preferred or non-preferred in the same way the transmitters can be identified as preferred or non-preferred.

By way of example, not by way of limitation, method(s) may comprise: identifying, from a plurality of ranging signals received by a receiver, a first set of visible ranging signals from the network of transmitters; associating each transmitter that transmitted a ranging signal from the first set with at least one of three or more groups based on geographic information associated with of that transmitter; and determining an estimated position of the receiver using at least one range measurement corresponding to at least one ranging signal from at least one transmitter in each of the three or more groups. The geographic information may be provided by the transmitters (e.g., latitude, longitude, altitude of the transmitter, or a mapped region within which the transmitter resides).

In accordance with some aspects, the geographic information associated with a transmitter includes an estimated azimuth relating to a location of the transmitter. In accordance with some aspects, each of the three or more groups corresponds to a different range of azimuths, and each transmitter is associated with a particular group of the three or more groups when the azimuth relating to that transmitter falls within the range of azimuths corresponding to that particular group.

In accordance with some aspects, the geographic information associated with a transmitter includes a location of the transmitter. In accordance with some aspects, each of the three or more groups corresponds to a different geographic region, and each transmitter is associated with a particular group of the three or more groups when the location relating to that transmitter falls within the geographic region corresponding to that particular group.

In accordance with some aspects, each of the three or more groups corresponds to a different geographic region in the network of transmitters.

Method(s) may further or alternatively comprise: determining, for each of the three or more groups, the number of transmitters associated with each group; determining, when the number is less than the integer M, the estimated position using range measurements corresponding to each of the transmitters in that group; and determining, when the number is equal to or greater than an integer M, the estimated position using at least M range measurements corresponding to at least M of the transmitters in that group.

Method(s) may further or alternatively comprise: determining, for each of the three or more groups, the number of transmitters associated with each group; determining, when the number is equal to or less than an integer M, the estimated position using range measurements corresponding to each of the transmitters in that group; and determining, when the number is greater than the integer M, the estimated position using a selection of M range measurements corresponding to M transmitters in that group, wherein a value of a quality metric for each of the M transmitters is at least equal to each value of the quality metric for the other unselected transmitters in that group. In accordance with some aspects, each value of the quality metric relates to at least one of: an estimated range error related to that transmitter; a trilateration weight related to that transmitter; an estimated distance between the transmitter and an initial estimate of the receiver's position; and an angle of incidence related to that transmitter.

In accordance with some aspects, the first set of visible ranging signals include each of the plurality of ranging signals with a signal-to-noise ratio above the signal-to-noise ratio threshold level.

Method(s) may further or alternatively comprise: identifying one or more preferred transmitters with a value of a quality metric that is above a threshold level of the quality metric; and determining the estimated position of the receiver using a range measurement corresponding to a preferred transmitter from each of the three or more groups that includes at least one of the preferred transmitters. Method(s) may further or alternatively comprise: identifying each non-preferred transmitter with a value of the quality metric that is below the threshold level of the quality metric, wherein the estimated position of the receiver is determined without using range measurements corresponding to any of the non-preferred transmitters from each of the three or more groups that includes at least one of the preferred transmitters.

Method(s) may further or alternatively comprise: for each of the three of more groups that do not include at least one of the preferred transmitters, identifying at least one non-preferred transmitter with a value of the quality metric that is below the threshold level of the quality metric, wherein the estimated position of the receiver is determined using range measurements corresponding to the at least one non-preferred transmitter.

Method(s) may further or alternatively comprise: deleting, from each of the groups any signal whose quality metric value is below a specified threshold (i.e., a non-preferred signals), or ignoring that non-preferred signal during trilateration processing.

By way of example, not by way of limitation, method(s) may comprise: identifying first, second and third sets of one or more transmitters from the network of transmitters, wherein each of the first, second and third sets of one or more transmitters includes a transmitter that is not included in the other sets; determining a first set of one or more quality metric values, each of which corresponds to a different transmitter in the first set of one or more transmitters; determining if a first quality metric value corresponding to a first transmitter in the first set of one or more transmitters meets a quality metric threshold condition; and after determining that the first quality metric value does not meet the quality metric threshold condition, determining the estimated position of the receiver without using a first range measurement corresponding to a first ranging signal transmitted by the first transmitter.

By way of example, not by way of limitation, method(s) may comprise: identifying first, second and third sets of transmitters from the network of transmitters, wherein each of the first, second and third sets of transmitters includes at least one transmitter that is not included in the other sets of transmitters; determining a first set of quality metric values, each of which corresponds to each transmitter from the first set of transmitters; identifying a first number of preferred transmitters that each correspond to a respective quality metric value from the first set of quality metric values that meets a quality metric threshold condition; determining if the first number of transmitters is less than a minimum number; after determining that the first number is greater than or equal to the minimum number, determining the estimated position of the receiver using only one or more range measurements corresponding to respective transmitters that correspond to respective quality metric values from the first set of quality metric values that meet a quality metric threshold condition; and after determining that the first number is less than the minimum number, determining the estimated position of the receiver using a first range measurement corresponding to a first non-preferred transmitter—that is, a first transmitter that corresponds to a first quality metric value from the first set of quality metric values that does not meet the quality metric value threshold condition.

In accordance with some aspects, the minimum number is two. In accordance with some aspects, the one or more range measurements consist of the minimum number of range measurements. In accordance with some aspects, the estimated position is determined using at least three range measurements, each of which correspond to a different transmitter from each of the first, second and third sets of transmitters. In accordance with some aspects, at least one transmitter in the network of transmitters is included in the two or more of the first, second and third sets of transmitters. In accordance with some aspects, each of the first, second and third sets of transmitters correspond to a different geographic region in the network of transmitters. In accordance with some aspects, each of the different geographic regions corresponds to different ranges of azimuths. In accordance with some aspects, a first quality metric value from the first set of quality metric values does not meet the quality metric threshold condition based on a comparison between the first quality metric value and a second quality metric value from the first set of quality metric values In accordance with some aspects, a first quality metric value from the first set of quality metric values represents a first estimated range error associated with a first transmitter of the first set of transmitters, wherein a second quality metric value from the first set of quality metric values represents a second estimated range error associated with a second transmitter of the first set of transmitters, and wherein the first quality metric value does not meet the quality metric threshold condition when the first estimated range error is higher than the second estimated range error.

In accordance with some aspects, a first quality metric value from the first set of quality metric values represents a first estimated distance between the estimated position and a first transmitter of the first set of transmitters, wherein a second quality metric value from the first set of quality metric values represents a second estimated distance between the estimated position and a second transmitter of the first set of transmitters, and wherein the first quality metric value does not meet the quality metric threshold condition when the first estimated distance is longer than the second estimated distance. In accordance with some aspects, a first quality metric value from the first set of quality metric values represents a first angle of incidence associated with a first transmitter of the first set of transmitters, wherein a second quality metric value from the first set of quality metric values represents a second angle of incidence associated with a second transmitter of the first set of transmitters, and wherein the first quality metric value does not meet the quality metric threshold condition when the first angle of incidence is greater than the second angle of incidence.

In accordance with some aspects, a first quality metric value from the first set of quality metric values does not meet the quality metric threshold condition when it indicates that an estimated range error associated with a first transmitter of the first set of transmitters is above a maximum range error value. In accordance with some aspects, a first quality metric value from the first set of quality metric values does not meet the quality metric threshold condition when it indicates that a first estimated distance between the estimated position and a first transmitter of the first set of transmitters is greater than a maximum distance. In accordance with some aspects, a first quality metric value from the first set of quality metric values does not meet the quality metric threshold condition when it indicates that a first angle of incidence associated with a first transmitter of the first set of transmitters is greater than a maximum angle of incidence.

In accordance with some aspects, a first range measurement corresponds to a first quality metric value from the first set of quality metric values that does not meet the quality metric threshold condition. Method(s) may further or alternatively comprise: determining if a first position error associated with not using the first range measurement to estimate the position of the receiver is lower than a second position error associated with using the first range measurement to estimate the position of the receiver, wherein the estimated position is determined without using the first range measurement when the first position error is lower than the second position error, and wherein the estimated position is determined using the first range measurement when the second position error is lower than the first position error. In accordance with some aspects, the first position error and the second position error relate to geometric position error. Method(s) may further or alternatively comprise: after determining that a first quality metric value does not meet the quality metric threshold condition, adjusting a first range measurement that corresponds to the first quality metric value, wherein the estimated position is determined using the adjusted first range measurement.

By way of example, not by way of limitation, method(s) may comprise: identifying a first set of two or more transmitters from the network of transmitters; evaluating the first set of transmitters to determine which transmitters are associated with one or more qualities; and refining the estimated position of the receiver based on the transmitters that exhibit the one or more qualities. In accordance with some aspects, a first number of transmitters in the first set depends on a density of terrain and manmade objects, where the first number and the first density are inversely proportional or proportional. Method(s) may further or alternatively comprise: identifying additional sets of two or more other transmitters from the network of transmitters. In accordance with some aspects, the number of transmitters in the first set differs from the number of transmitters in the second set, or the numbers of transmitters in all sets, including the first set and the second set, are equal. In accordance with some aspects, the size of a first region is based on a spatial mapping of natural terrain or manmade structures nearby the transmitters of the network. Method(s) may further or alternatively comprise: calculating a first value of a quality metric corresponding to a first transmitter in the first set, where the estimated position is refined based on a first range measurement corresponding to the first transmitter when the first value of the quality metric meets a threshold condition. Method(s) may further or alternatively comprise: calculating a first value of a quality metric corresponding to a first transmitter in the first set; and calculating a second value of the quality metric corresponding to a second transmitter in the first set, where the estimated position is refined based on a first range measurement corresponding to the first transmitter when the first value of the quality metric is preferred over the second value of the quality metric, and the estimated position is refined based on a second range measurement corresponding to the second transmitter when the second value of the quality metric is preferred over the first value of the quality metric. In accordance with some aspects, the first quality metric is based on a calculation of one or more weighted sub metrics selected from the group consisting of: estimated range error, weight applied to the first range measurement during trilateration, estimated distance between the estimated position and the first transmitter, quantification of probable multipath effect associated with obstructions in the direction of the first transmitter from the estimated position; and angle of incidence of first transmitter. In accordance with some aspects, only a subset of transmitters from the first set of transmitters are associated with the one or more qualities. In accordance with some aspects, the one or more qualities include one or more of low estimated range error, high weight applied to range measurement of the respective transmitters during trilateration, shorter estimated distance between the estimated position and the respective transmitter with respect to estimated distances for other transmitters, low estimated multipath effect associated with obstructions in the direction of the respective transmitter from the estimated position, and high angle of incidence of the respective transmitter.

Example Systems and Other Aspects

Figure 6:
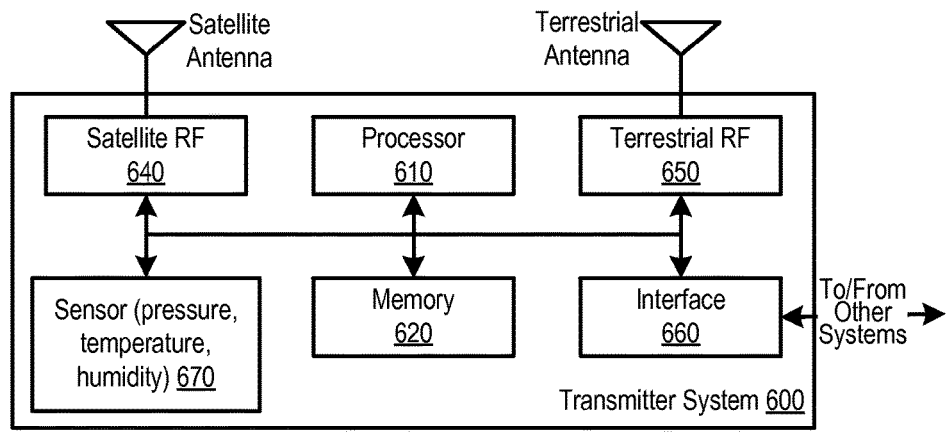
FIG. 6 depicts aspects of a transmitter system.

FIG. 6 illustrates details of transmitter system 600 at which signals may be generated and transmitted. Transmitter system 600 may include processor 610 that carries out signal processing (e.g., interpreting received signals and generating transmission signals). One or more memories 620 may provide storage and retrieval of data and/or executable instructions for performing functions described herein. Transmitter system 600 may further include one or more antenna components (e.g., satellite antenna 630a or terrestrial antenna 630b) for transmitting and receiving signals, satellite RF component 640 for receiving satellite signals, from which location information and/or other information (e.g., timing, dilution of precision (DOP), or other) may be extracted, terrestrial RF component 650 for receiving signals from a terrestrial network, and/or for generating and sending output signals, and interface 660 for communicating with other systems. Transmitter system 600 may also include one or more environmental sensors 670 for sensing environmental conditions (e.g., pressure, temperature, humidity, wind, sound, or other), which may be compared to such conditions as sensed at a receiver in order to estimate a position of the receiver based on similarities and differences between the conditions at transmitter system 600 and the receiver. It is noted that transmitter system 600 may be implemented by the transmitters described herein, which may alternatively take on other forms as known by one of skill in the art. Each transmitter system 600 may also include various elements as are known or developed in the art for providing output signals to, and receiving input signals from, the antennas, including analog or digital logic and power circuitry, signal processing circuitry, tuning circuitry, buffer and power amplifiers, and the like.

Figure 7:
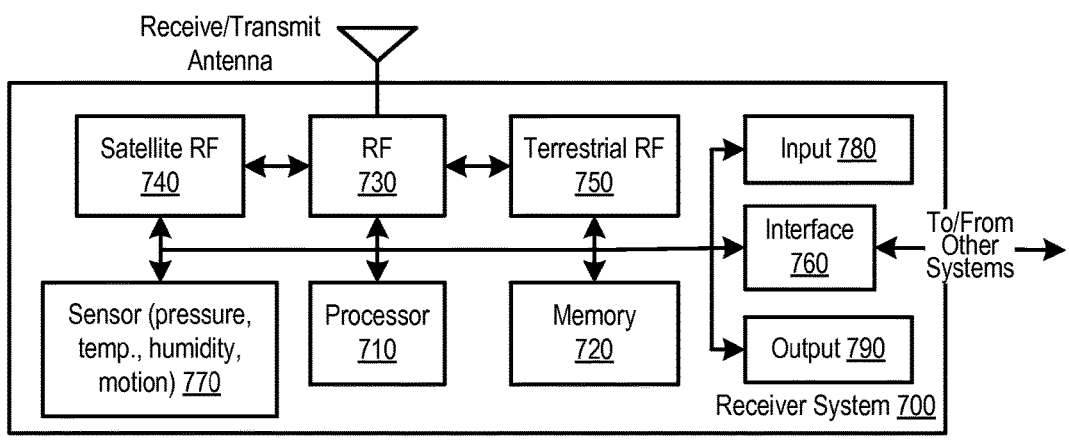
FIG. 7 depicts aspects of a receiver system.

FIG. 7 illustrates details of receiver system 700, at which signals from transmitters (e.g., transmitter system 600) may be received and processed to extract information used to compute an estimated position of receiver system 700. Receiver system 700 may include any of a variety of electronic devices configured to receive RF or other signaling using wireless means (radio frequency, Wi-Fi, Wi-Max, Bluetooth, or other wireless channels as is known or later developed in the art), or wired means (e.g., Ethernet, USB, flash RAM, or other similar channels as is known or later developed in the art). Each receiver system 700 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to receiver system 700. As shown, RF component 730 may control the exchange of information with other systems (e.g., satellite, terrestrial). Signal processing may occur at satellite component 740, or terrestrial component 750, which may use separate or shared resources such as antennas, RF circuitry, and the like. One or more memories 720 may be coupled to a processor 10 to provide storage and retrieval of data and/or instructions relating to methodologies described herein that may be executed by processor 710. Receiver system 700 may further include one or more sensors 770 for measuring environmental conditions like pressure, temperature, humidity, acceleration, direction of travel, wind force, wind direction, sound, or other conditions. Receiver system 700 may further include input and output (I/O) components 780 and 790, which may include a keypad, touchscreen display, camera, microphone, speaker, or others, which may be controlled by means known in the art. It is noted that receiver system 600 may be implemented by the receivers described herein, which may alternatively take on other forms as known by one of skill in the art.

In some embodiments, transmitter system 600 and/or receiver system 700 may be connected, via various wired or wireless communication link, to a server system (not shown), which may receive/send information from/to transmitter system 600 and/or receiver system 700. The server system may also control operations of transmitter system 600 and/or receiver system 700. Some or all processing that can be performed at transmitter system 600 and/or receiver system 700 may alternatively be performed by a one or more processors that are remote from those systems (e.g., in a different city, state, region, or country). Such remote processors may be located at the server system. Thus, processing may be geographically distributed. Processing in one system or component may be initiated by another system (e.g., upon receipt of signals or information from the other system).

Other Aspects

Description related to "transmitters" may extend to either or both of terrestrial and satellite transmitters. Geometric dilution of precision may be determined in relation to two and three dimensions. For the most part, when referring to DOP the discussion herein refers to geometric dilution of precision, rather than including time dilution of precision. Regions may overlap each other, or may be disjointed geographic regions. The number of transmitters in each azimuthal region may be a factor of geometry (e.g., where the receiver is located and where the transmitters are located), so that, for example, there may be many transmitters in one quadrant relative to the position of the receiver (e.g., a northeast quadrant) and few transmitters in another quadrant (e.g., a southwest quadrant). For example, as the receiver moves in a northeasterly direction, the number of transmitters to the northeast of the receiver's new location may decrease. As the number of visible transmitters decreases, information from a greater percentage of transmitters in that direction may be used during trilateration processing to avoid poor DOP characteristics.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and user device, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and operated from different platforms used by known operating systems. Instructions embodied in firmware can be contained in an integrated circuit or other suitable device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source. A data source may be used to store information, and may include any storage devices known by one of skill in the art. As used herein, computer-readable media includes all forms of computer-readable medium except, to the extent that such media is deemed to be non-statutory (e.g., transitory propagating signals). Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The disclosure is not intended to be limited to the aspects shown herein but is to be accorded the widest scope understood by a skilled artisan, including equivalent systems and methods.

The invention claimed is:

1. A method for estimating a position of a receiver using a network of transmitters, the method comprising:
    identifying a set of transmitters from the network of transmitters;
    using geographic information associated with each transmitter in the set of transmitters to identify three or more groups of transmitters, wherein each group of the three or more groups includes at least one transmitter from the set of transmitters;
    determining, for each group of the three or more groups, a number of transmitters included in that group;
    for each group of the three or more groups that includes a number of transmitters that is less than an integer M, identifying at least one range measurement corresponding to at least one transmitter in that group, wherein the integer M is greater than or equal to two;
    for each group of the three or more groups that includes a number of transmitters that is equal to or greater than the integer M, identifying at least M range measurements corresponding to at least M transmitters in that group; and
    determining, using at least one processor, an estimated position of the receiver using all of the identified range measurements.

2. The method of claim 1, wherein the geographic information associated with each transmitter in the set of transmitters includes an estimated azimuth relating to a location of that transmitter, wherein each group of the three or more groups corresponds to a different range of azimuths, and wherein each transmitter in the set of transmitters is included in a particular group of the three or more groups when the azimuth relating to the location of that transmitter is within the range of azimuths corresponding to that particular group.

3. The method of claim 1, wherein the geographic information associated with each transmitter in the set of transmitters includes a location of that transmitter, wherein each group of the three or more groups corresponds to a different geographic region, and wherein each transmitter in the set of transmitters is included in a particular group of the three or more groups when the location relating to that transmitter is in the geographic region corresponding to that particular group.

4. The method of claim 1, wherein the method comprises:
    for each group of the three or more groups that includes a number of transmitters that is equal to or greater than the integer M, no more than M range measurements corresponding to M transmitters in that group are identified.

5. The method of claim 1, wherein each value of a quality metric for each of the at least M transmitters in that group is at least equal to each value of the quality metric for the other transmitters in that group that are not members of the at least M transmitters, and wherein each value of the quality metric for each of the transmitters in that group relates to at least one of an estimated range error for that transmitter, a trilateration weight for that transmitter, an estimated distance between that transmitter and an initial estimate of the receiver's position, or an angle of incidence for that transmitter.

6. The method of claim 1, wherein the method comprises:
    identifying, from the set of transmitters, one or more preferred transmitters with a value of a quality metric that is above a threshold level; and
    for each group of the three or more groups that includes at least one preferred transmitter from the one or more preferred transmitters, identifying a range measurement corresponding to a preferred transmitter of the at least one preferred transmitter in that group as one of the identified range measurements used to determine the estimated position of the receiver,
    wherein each value of the quality metric for each of the one or more preferred transmitters relates to at least one of an estimated range error for that transmitter, a trilateration weight for that transmitter, an estimated distance between that transmitter and an initial estimate of the receiver's position, or an angle of incidence for that transmitter.

7. The method of claim 1, wherein the set of transmitters includes one or more non-preferred transmitters each with a respective value of a quality metric that is not above a threshold level, and wherein the method comprises:
    for each group of the three or more groups that includes at least one transmitter that is not one of the non-preferred transmitters, not identifying any range measurement corresponding to any of the non-preferred transmitters in that group as one of the identified range measurements used to determine the estimated position of the receiver,
    wherein each value of the quality metric for each of the one or more non-preferred transmitters relates to at least one of an estimated range error for that transmitter, a trilateration weight for that transmitter, an estimated distance between that transmitter and an initial estimate of the receiver's position, or an angle of incidence for that transmitter.

8. The method of claim 1, wherein the method comprises:
    for each transmitter in each group of the three or more groups that includes a number of transmitters that is less than the integer M, identifying a range measurement corresponding to that transmitter as one of the identified range measurements used to determine the estimated position of the receiver.

9. The method of claim 1, wherein the method comprises:
    determining a first number of transmitters in a first group of the three or more groups;
    determining a second number of transmitters in a second group of the three or more groups;
    determining that the first number is less than the integer M;
    determining that the second number is equal to or greater than the integer M;

for each transmitter in the first group, identifying a range measurement corresponding to that transmitter as one of the identified range measurements used to determine the estimated position of the receiver; and for each of at least M transmitters in the second group, identifying a range measurement corresponding to that transmitter as one of the identified range measurements used to determine the estimated position of the receiver.

10. A method for estimating a position of a receiver using a network of transmitters, the method comprising:
   identifying a set of transmitters from the network of transmitters;
   using geographic information associated with each transmitter in the set of transmitters to identify three or more groups of transmitters, wherein each group of the three or more groups includes at least one transmitter from the set of transmitters;
   determining, for each group of the three or more groups, a number of transmitters included in that group;
   for each group of the three or more groups that includes a number of transmitters that is less than or equal to an integer M, identifying at least one range measurement corresponding to at least one transmitter in that group, wherein the integer M is greater than or equal to two;
   for each group of the three or more groups that includes a number of transmitters that is greater than the integer M, identifying at least M range measurements corresponding to at least M transmitters in that group; and
   determining, using at least one processor, an estimated position of the receiver using all of the identified range measurements.

11. The method of claim 10, wherein the geographic information associated with each transmitter in the set of transmitters includes an estimated azimuth relating to a location of that transmitter, wherein each group of the three or more groups corresponds to a different range of azimuths, and wherein each transmitter in the set of transmitters is included in a particular group of the three or more groups when the azimuth relating to the location of that transmitter is within the range of azimuths corresponding to that particular group.

12. The method of claim 10, wherein the geographic information associated with each transmitter in the set of transmitters includes a location of that transmitter, wherein each group of the three or more groups corresponds to a different geographic region, and wherein each transmitter in the set of transmitters is included in a particular group of the three or more groups when the location relating to that transmitter is in the geographic region corresponding to that particular group.

13. The method of claim 10, wherein the method comprises:
   for each group of the three or more groups that includes a number of transmitters that is greater than the integer M, no more than M range measurements corresponding to M transmitters in that group are identified.

14. The method of claim 10, wherein each value of a quality metric for each of the at least M transmitters in that group is at least equal to each value of the quality metric for the other transmitters in that group that are not members of the at least M transmitters, and wherein each value of the quality metric for each of the transmitters in that group relates to at least one of an estimated range error for that transmitter, a trilateration weight for that transmitter, an estimated distance between that transmitter and an initial estimate of the receiver's position, or an angle of incidence for that transmitter.

15. The method of claim 10, wherein the method comprises:
   identifying, from the set of transmitters, one or more preferred transmitters with a value of a quality metric that is above a threshold level; and
   for each group of the three or more groups that includes at least one preferred transmitter from the one or more preferred transmitters, identifying a range measurement corresponding to a preferred transmitter of the at least one preferred transmitter in that group as one of the identified range measurements used to determine the estimated position of the receiver,
   wherein each value of the quality metric for each of the one or more preferred transmitters relates to at least one of an estimated range error for that transmitter, a trilateration weight for that transmitter, an estimated distance between that transmitter and an initial estimate of the receiver's position, or an angle of incidence for that transmitter.

16. The method of claim 10, wherein the set of transmitters includes one or more non-preferred transmitters each with a respective value of the quality metric that is not above the threshold level, and wherein the method comprises:
   identifying, from the set of transmitters, the one or more non-preferred transmitters each with a respective value of the quality metric that is not above the threshold level; and
   for each group of the three or more groups that includes at least one transmitter that is not one of the non-preferred transmitters, not identifying any range measurement corresponding to any of the non-preferred transmitters in that group as one of the identified range measurements used to determine the estimated position of the receiver,
   wherein each value of the quality metric for each of the one or more non-preferred transmitters relates to at least one of an estimated range error for that transmitter, a trilateration weight for that transmitter, an estimated distance between that transmitter and an initial estimate of the receiver's position, or an angle of incidence for that transmitter.

17. The method of claim 10, wherein the method comprises:
   for each transmitter in each group of the three or more groups that includes a number of transmitters that is less than or equal to an integer M, identifying a range measurement corresponding to that transmitter as one of the identified range measurements used to determine the estimated position of the receiver.

18. The method of claim 10, wherein the method comprises:
   determining a first number of transmitters in a first group of the three or more groups;
   determining a second number of transmitters in a second group of the three or more groups;
   determining that the first number is less than or equal to the integer M;
   determining that the second number is greater than the integer M;
   for each transmitter in the first group, identifying a range measurement corresponding to that transmitter as one of the identified range measurements used to determine the estimated position of the receiver; and
   for each of at least M transmitters in the second group, identifying a range measurement corresponding to that transmitter as one of the identified range measurements used to determine the estimated position of the receiver.

19. One or more non-transitory processor-readable media embodying program instructions that, when executed by one or more processors, cause the one or more processors to implement a method for estimating a position of a receiver using a network of transmitters, the method comprising:
- identifying a set of transmitters from the network of transmitters;
- using geographic information associated with each transmitter in the set of transmitters to identify three or more groups of transmitters, wherein each group of the three or more groups includes at least one transmitter from the set of transmitters;
- determining, for each group of the three or more groups, a number of transmitters included in that group;
- for each group of the three or more groups that includes a number of transmitters that is less than an integer M, identifying at least one range measurement corresponding to at least one transmitter in that group, wherein the integer M is greater than or equal to two;
- for each group of the three or more groups that includes a number of transmitters that is equal to or greater than the integer M, identifying at least M range measurements corresponding to at least M transmitters in that group; and
- determining an estimated position of the receiver using all of the identified range measurements.

20. One or more non-transitory processor-readable media embodying program instructions that, when executed by one or more processors, cause the one or more processors to implement a method for estimating a position of a receiver using a network of transmitters, the method comprising:
- identifying a set of transmitters from the network of transmitters;
- using geographic information associated with each transmitter in the set of transmitters to identify three or more groups of transmitters, wherein each group of the three or more groups includes at least one transmitter from the set of transmitters;
- determining, for each group of the three or more groups, a number of transmitters included in that group;
- for each group of the three or more groups that includes a number of transmitters that is less than or equal to an integer M, identifying at least one range measurement corresponding to at least one transmitter in that group, wherein the integer M is greater than or equal to two;
- for each group of the three or more groups that includes a number of transmitters that is greater than the integer M, identifying at least M range measurements corresponding to at least M transmitters in that group; and
- determining an estimated position of the receiver using all of the identified range measurements.

21. The one or more non-transitory processor-readable media of claim 19, wherein the geographic information associated with each transmitter in the set of transmitters includes an estimated azimuth relating to a location of that transmitter, wherein each group of the three or more groups corresponds to a different range of azimuths, and wherein each transmitter in the set of transmitters is included in a particular group of the three or more groups when the azimuth relating to the location of that transmitter is within the range of azimuths corresponding to that particular group.

22. The one or more non-transitory processor-readable media of claim 19, wherein the geographic information associated with each transmitter in the set of transmitters includes a location of that transmitter, wherein each group of the three or more groups corresponds to a different geographic region, and wherein each transmitter in the set of transmitters is included in a particular group of the three or more groups when the location relating to that transmitter is in the geographic region corresponding to that particular group.

23. The one or more non-transitory processor-readable media of claim 19, wherein the method comprises:
- for each group of the three or more groups that includes a number of transmitters that is equal to or greater than the integer M, no more than M range measurements corresponding to M transmitters in that group are identified.

24. The one or more non-transitory processor-readable media of claim 19, wherein each value of a quality metric for each of the at least M transmitters in that group is at least equal to each value of the quality metric for the other transmitters in that group that are not members of the at least M transmitters, and wherein each value of the quality metric for each of the transmitters in that group relates to at least one of an estimated range error for that transmitter, a trilateration weight for that transmitter, an estimated distance between that transmitter and an initial estimate of the receiver's position, or an angle of incidence for that transmitter.

25. The one or more non-transitory processor-readable media of claim 19, wherein the method comprises:
- identifying, from the set of transmitters, one or more preferred transmitters with a value of a quality metric that is above a threshold level; and
- for each group of the three or more groups that includes at least one preferred transmitter from the one or more preferred transmitters, identifying a range measurement corresponding to a preferred transmitter of the at least one preferred transmitter in that group as one of the identified range measurements used to determine the estimated position of the receiver,
- wherein each value of the quality metric for each of the one or more preferred transmitters relates to at least one of an estimated range error for that transmitter, a trilateration weight for that transmitter, an estimated distance between that transmitter and an initial estimate of the receiver's position, or an angle of incidence for that transmitter.

26. The one or more non-transitory processor-readable media of claim 19, wherein the set of transmitters includes one or more non-preferred transmitters each with a respective value of a quality metric that is not above a threshold level, and wherein the method comprises:
- for each group of the three or more groups that includes at least one transmitter that is not one of the non-preferred transmitters, not identifying any range measurement corresponding to any of the non-preferred transmitters in that group as one of the identified range measurements used to determine the estimated position of the receiver,
- wherein each value of the quality metric for each of the one or more non-preferred transmitters relates to at least one of an estimated range error for that transmitter, a trilateration weight for that transmitter, an estimated distance between that transmitter and an initial estimate of the receiver's position, or an angle of incidence for that transmitter.

27. The one or more non-transitory processor-readable media of claim 19, wherein the method comprises:
- for each transmitter in each group of the three or more groups that includes a number of transmitters that is less than the integer M, identifying a range measurement corresponding to that transmitter as one of the identified range measurements used to determine the estimated position of the receiver.

28. The one or more non-transitory processor-readable media of claim 19, wherein the method comprises:
   determining a first number of transmitters in a first group of the three or more groups;
   determining a second number of transmitters in a second group of the three or more groups;
   determining that the first number is less than the integer M;
   determining that the second number is equal to or greater than the integer M;
   for each transmitter in the first group, identifying a range measurement corresponding to that transmitter as one of the identified range measurements used to determine the estimated position of the receiver; and
   for each of at least M transmitters in the second group, identifying a range measurement corresponding to that transmitter as one of the identified range measurements used to determine the estimated position of the receiver.

29. The one or more non-transitory processor-readable media of claim 20, wherein the geographic information associated with each transmitter in the set of transmitters includes an estimated azimuth relating to a location of that transmitter, wherein each group of the three or more groups corresponds to a different range of azimuths, and wherein each transmitter in the set of transmitters is included in a particular group of the three or more groups when the azimuth relating to the location of that transmitter is within the range of azimuths corresponding to that particular group.

30. The one or more non-transitory processor-readable media of claim 20, wherein the geographic information associated with each transmitter in the set of transmitters includes a location of that transmitter, wherein each group of the three or more groups corresponds to a different geographic region, and wherein each transmitter in the set of transmitters is included in a particular group of the three or more groups when the location relating to that transmitter is in the geographic region corresponding to that particular group.

31. The one or more non-transitory processor-readable media of claim 20, wherein the method comprises:
   for each group of the three or more groups that includes a number of transmitters that is greater than the integer M, no more than M range measurements corresponding to M transmitters in that group are identified.

32. The one or more non-transitory processor-readable media of claim 20, wherein each value of a quality metric for each of the at least M transmitters in that group is at least equal to each value of the quality metric for the other transmitters in that group that are not members of the at least M transmitters, and wherein each value of the quality metric for each of the transmitters in that group relates to at least one of an estimated range error for that transmitter, a trilateration weight for that transmitter, an estimated distance between that transmitter and an initial estimate of the receiver's position, or an angle of incidence for that transmitter.

33. The one or more non-transitory processor-readable media of claim 20, wherein the method comprises:
   identifying, from the set of transmitters, one or more preferred transmitters with a value of a quality metric that is above a threshold level; and
   for each group of the three or more groups that includes at least one preferred transmitter from the one or more preferred transmitters, identifying a range measurement corresponding to a preferred transmitter of the at least one preferred transmitter in that group as one of the identified range measurements used to determine the estimated position of the receiver,
   wherein each value of the quality metric for each of the one or more preferred transmitters relates to at least one of an estimated range error for that transmitter, a trilateration weight for that transmitter, an estimated distance between that transmitter and an initial estimate of the receiver's position, or an angle of incidence for that transmitter.

34. The one or more non-transitory processor-readable media of claim 20, wherein the set of transmitters includes one or more non-preferred transmitters each with a respective value of the quality metric that is not above the threshold level, and wherein the method comprises:
   identifying, from the set of transmitters, the one or more non-preferred transmitters each with a respective value of the quality metric that is not above the threshold level; and
   for each group of the three or more groups that includes at least one transmitter that is not one of the non-preferred transmitters, not identifying any range measurement corresponding to any of the non-preferred transmitters in that group as one of the identified range measurements used to determine the estimated position of the receiver,
   wherein each value of the quality metric for each of the one or more non-preferred transmitters relates to at least one of an estimated range error for that transmitter, a trilateration weight for that transmitter, an estimated distance between that transmitter and an initial estimate of the receiver's position, or an angle of incidence for that transmitter.

35. The one or more non-transitory processor-readable media of claim 20, wherein the method comprises:
   for each transmitter in each group of the three or more groups that includes a number of transmitters that is less than or equal to an integer M, identifying a range measurement corresponding to that transmitter as one of the identified range measurements used to determine the estimated position of the receiver.

36. The one or more non-transitory processor-readable media of claim 20, Wherein the method comprises:
   determining a first number of transmitters in a first group of the three or more groups;
   determining a second number of transmitters in a second group of the three or more groups;
   determining that the first number is less than or equal to the integer M;
   determining that the second number is greater than the integer M;
   for each transmitter in the first group, identifying a range measurement corresponding to that transmitter as one of the identified range measurements used to determine the estimated position of the receiver; and
   for each of at least M transmitters in the second group, identifying a range measurement corresponding to that transmitter as one of the identified range measurements used to determine the estimated position of the receiver.

* * * * *